United States Patent [19]
Isayev et al.

[11] Patent Number: 5,070,157
[45] Date of Patent: Dec. 3, 1991

[54] SELF REINFORCED COMPOSITE OF THERMOTROPIC LIQUID CRYSTAL POLYMERS

[75] Inventors: Avraam I. Isayev; Pazampalaco R. Subramanian, both of Akron, Ohio

[73] Assignee: University of Akron, Akron, Ohio

[21] Appl. No.: 568,601

[22] Filed: Aug. 16, 1990

[51] Int. Cl.[5] ................................ C08L 67/03
[52] U.S. Cl. ................................ 525/444; 524/539
[58] Field of Search ................................ 525/444

[56] References Cited

U.S. PATENT DOCUMENTS 4,267,289 5/1981 Froix ................................ 525/444
4,728,698 3/1988 Isayev ................................ 525/439
4,837,268 6/1989 Matsumoto ................................ 525/444

*Primary Examiner*—Patricia Short
*Attorney, Agent, or Firm*—Oldham & Oldham Co.

[57] ABSTRACT

Blend of two or more thermotropic liquid crystal polymers and process for preparing same. Blends of this invention contain at least two, preferably only two, thermotropic liquid crystal polymers which are melt processable. These liquid crystal polymers are wholly aromatic polyesters. At least two polymers in the blend are processable in the melt phase and phase separated in the solid phase. Solid reinforcing agents may be present, but are not necessary and in any case must be in the solid phase at temperatures at which the blend is melt processable. Products of this invention are formed in the melt phase under high strain conditions.

16 Claims, 2 Drawing Sheets

SELF REINFORCED COMPOSITE OF THERMOTROPIC LIQUID CRYSTAL POLYMERS

FIELD OF THE INVENTION

This invention relates to self-reinforced polymer composites and processes for making the same, and more particularly to novel self-reinforced polymer composites comprising at least two melt processable wholly aromatic polyesters and to processes for making the same.

BACKGROUND ART

Fiber-reinforced polymer composites are well known and widely used. Polymers of improved strength and increased stiffness can be obtained by the use of an appropriate reinforcing fiber. Probably the most widely used reinforcing fibers are glass, carbon and aramid (or "Kevlar" which is a registered trademark of the E. I. du Pont de Nemours & Co., Wilmington, Del.).

The base polymers used in making reinforced polymer composites such as those described above include a wide range of thermoplastics, such as polystyrene and copolymers thereof, polyamides, polycarbonates, polyetherimide, polyether etherketone (PEEK) and polyesters such as polybutylene terephthalate. These polymers are thermoplastics and are either amorphous or semi-crystalline. They may be called flexible chain polymers, since individual monomer units in the polymer chain are free to rotate with respect to each other so that the polymer chain may assume a random shape. By way of illustration, F. N. Cogswell, *Intern. Polymer Processing*, vol. 1, no. 4, pages 157–165 (1987) discloses carbon fiber-reinforced PEEK.

More recently developed are self-reinforced polymer composites comprising long, continuous, predominantly unidirectionally oriented fibers of a melt processable wholly aromatic polyester in a matrix of a thermoplastic flexible chain polymer. Such polymer composites are described for example in commonly assigned, U.S. Pat. No. 4,728,698 of Avraam Isayev et al., issued Mar. 1, 1988, and U.S. Pat. No. 4,835,047 of Avraam Isayev et al issued May 30, 1989. As described therein, the fibers of the wholly aromatic polyester, which may also be termed a thermotropic liquid crystal polymer (LCP), are long continuous fibers formed in situ by mixing the matrix of base polymer with the wholly aromatic polyester in a suitable mixing and extrusion apparatus, as for example, an extruder-static mixer setup, or a twin screw extruder.

Polymer composites specifically disclosed in U.S. Pat. No. 4,728,698 are polycarbonate/LCP composites containing from 2.5 to 50 weight percent of LCP, and polyetherimide/LCP composites containing from 5 to 30 percent by weight of LCP. Those described in U.S. Pat. No. 4,835,047 are composites of polyetherimide (PEI) and a wholly aromatic polyester or LCP, in which the LCP content varies from 40 to 95 percent by weight. These composites of PEI and an LCP are also described in A. I. Isayev and S. Swaminathan, "Thermoplastic Fiber-Reinforced Composites Based on Liquid Crystalline Polymers," *Proceedings of the Third Annual Conference on Advanced Composites*, pages 259–267, 15–17 September 1987, Detroit, Mich., published by ASM International.

U.S. Pat. No. 4,650,836 discloses a method for rendering melt processable a liquid crystal polymer (LCP) not otherwise readily processable, in which said LCP is blended with a second, low molecular weight liquid crystal diester. The low molecular weight diester may be transesterified into the polyester to produce a long chain having desirable final liquid crystal polymer properties.

M. P. De Meuse and M. Jaffe, *Polymer Preprints*, vol. 30, no. II, September 1989, pp 540–541, disclose LCP/LCP blends which are miscible in both the melt and solid states.

Neither U.S. Pat. No. 4,650,836 nor the above-cited *Polymer Preprints* article discloses the physical or mechanical properties of the respective blends.

DISCLOSURE OF THE INVENTION

Applicants have found that outstanding physical and mechanical properties are obtained in blends of thermotropic liquid crystal polymers which are phase separated in the solid state and which contain a matrix phase and a fiber reinforcing phase which is formed in situ. These blends are strong, light weight polymer composites wherein strengths exceeding those achieved to date in any unreinforced plastics. In fact, the strengths of composites according to this invention are in the same range as those of steel on a volume basis and are stronger than aluminum, and yet have lower density than aluminum and much lower density than stainless steel.

This invention according to one aspect provides a blend of thermotropic liquid crystal polymers having overlapping melt processing temperature ranges, each of the liquid crystal polymers being a wholly aromatic polyester, at least two liquid crystal polymers in the blend being processable in the melt phase and phase separated in the solid state; the blend in the solid state comprising a matrix phase in which at least one liquid crystal polymer is present and a reinforcing phase in which another liquid crystal polymer is present, the reinforcing phase being formed in situ under high strain melt processing conditions.

This invention according to another aspect provides a process for making the aforesaid blends or composites.

The preferred LCP blends or composites according to this invention are those in which two liquid crystal polymers are present, each present in amounts of 2 to 98 percent by weight based on total LCP weight, one LCP forming the matrix phase and the other forming the reinforcing phase.

This invention according to another aspect provides a process for preparing a self-reinforced polymer composite which is a blend of liquid crystal polymers as described above. This process comprises mixing two or more thermotropic liquid crystal polymers which have overlapping melt processing temperature ranges, heating the resulting solid mixture to a temperature at which both polymers are melt processable, subjecting the melt to high strain mixing conditions effective to give, on cooling, a polymer composite or blend comprising a matrix phase in which at least one liquid crystal polymer is present and a reinforcing phase in which another liquid crystal polymer is present, extruding or shaping the resulting blend in the melt phase, cooling the blend and recovering a self-reinforced polymer composite comprising a matrix phase in which at least one liquid crystal polymer is present and a reinforcing phase in which another liquid crystal polymer is present. Typically, the reinforcing phase is predominantly in the form of long thin fibers having diameters not over about 10 microns and which are essentially unidirectionally oriented. Throughout the specification including the claims, amounts and percentages are by weight unless the contrary is explicitly stated. Also, standard abbreviations, such as GPa for gigapascals and MPa megapascals, have their usual meanings.

BEST MODE FOR CARRYING OUT THE INVENTION

Figure 1:
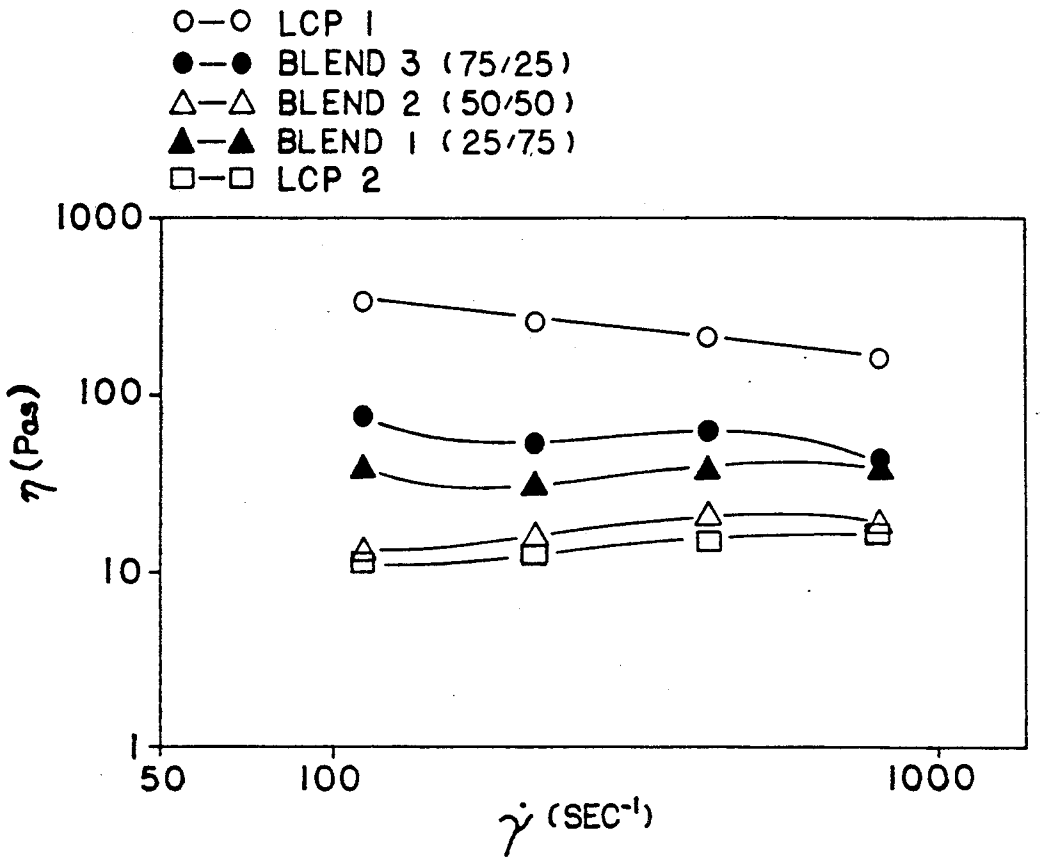
FIG. 1 is a graph showing viscosity as a function of shear rate for a first liquid crystal polymer (LCP-1), a second liquid crystal polymer (LCP-2) and blends thereof.

The starting materials for preparing the novel polymer composites or blends of this invention are two or more thermotropic liquid crystal polymers having overlapping melt processing temperature ranges.

One of these liquid crystal polymer starting materials (hereinafter designated as LCP-1) is a wholly aromatic polyester. The polyester starting materials are melt processable, wholly aromatic polyesters such as those described in U.S. Pat. Nos. 3,991,014; 4,067,852; 4,083,829; 4,130,545; 4,161,470; 4,318,842 and 4,468,364 and in G. W. Calundann et al, "Anisotropic Polymers, Their Synthesis and Properties", reprinted from the Robert A. Welch Conferences on Chemical Research, XXVI Synthetic Polymers, Nov. 15–17, 1982, Houston, Tex., pp 247–291. The melt processable or thermotropic, polyester may also be described as a liquid crystal polymer (LCP) since it exhibits anisotropy even in the melt phase.

A preferred wholly aromatic polyester thermotropic liquid crystal polymer is one having a melting point of about 275° C. and is supplied by Celanese Research Company, Summit, N.J. under the designation "Vectra" A950. This polymer is believed to consist essentially of about 70–75 mole percent of p-oxybenzoyl moieties and 25–30 mole percent of 6-oxy-2-naphthoyl moieties, as described for example in U.S. Pat. No. 4,161,470 and in example 4 of U.S. Pat. No. 4,468,364.

The second liquid crystal polymer or LCP is a thermotropic rigid rod material sold by Badische Anilin und Sodafabrik (BASF) of Ludwigshafen, Germany under the trademark "ULTRAX" KR-4002. This material is believed to be a wholly aromatic polyester consisting of p-oxybenzoyl, terephthaloyl and hydroquinone moieties.

Additional liquid crystal polymers, each having a melting point as above specified, may be present but are not necessary. In fact, the preferred polymer composites of this invention are those which the binary polymer blends consist essentially of the two above-described liquid crystal polymers.

The wholly aromatic polyester thermotropic liquid crystal polymers used as starting materials herein are each copolyesters comprising repeating units of two or more aromatic ester moieties (as illustrated above, for example); other aromatic moieties, such as the divalent moiety derived from hydroquinone (also as illustrated above).

When only two liquid crystal polymers are present, the amount of each is from about 2 to about 98 percent of total blend weight (which is total liquid crystal polymer weight). When more than two liquid crystal polymers are present, no one liquid crystal polymer is present in amounts exceeding 98 percent of total liquid crystal polymer weight.

At least two of the liquid crystal polymer starting materials must be processable in the melt phase but phase separated in all proportions in the solid phase, in order to attain a composite in the form of a matrix phase and a reinforcing phase as above described. Also, the two liquid crystal polymers must have overlapping melt processing temperature ranges. When more than two LCPs are present, the additional LCPs may be either compatible or incompatible with either of the first two LCPs (but should not be compatible with both) in the solid phase, and preferably are processable with both the first two LCPs in the liquid phase.

Additional materials (i.e., materials which are not liquid crystal polymers) are not required but may be present. Thus, it is within the scope of the invention to prepare a mixed composite polymer by inclusion of an additional reinforcing fiber, such as glass, carbon, or aramid, in addition to the wholly aromatic polyesters. The additional reinforcement provided by the additional fiber is not necessary in most cases, but where a very high stiffness (or very high strength) reinforced polymer composite is desired, such can be attained according to the present invention without the high loadings of conventional reinforcing fiber required in presently known conventional polymer/fiber composites.

Other additives, such as pigments and fillers, coupling or compatibilizing agents (which will promote bonding between fiber and matrix at the interface), flame retardants, lubricants, mold release agents, plasticizers and ultraviolet stabilizers, may be mixed with the wholly aromatic liquid crystal polyester blend as desired. The use of such additives is well known in the polymer processing art. Any other additives used should be solid at the melt processing temperature (which is typically 280° to 350° C.), and are therefore preferably solid at temperatures up to at least about 350° C. Use of solvents is unnecessary.

The liquid crystal polymers are mixed at ambient temperature to form a physical mixture. Any additional ingredients which are desired in the final product may also be mixed in at this time. The physical mixture is then dried under conventional conditions, e.g., at temperatures of about 100° C. to about 150° C. for approximately 6 to 24 hours, in a vacuum oven. The dry blended polymers (and additives, if any) are then thoroughly mixed at a temperature above the melting points of both polymers in a suitable mixing apparatus which will give thorough high strain mixing sufficient to cause formation of a reinforcing phase in a matrix.

Typically the matrix consists of one liquid crystal polymer and the reinforcing phase consists of the other liquid crystal polymer when only two liquid crystal polymers are used; when more than two liquid crystal polymer starting materials are used, the matrix phase may contain one or more liquid crystal polymers and the reinforcing phase or phases (since more than one reinforcing phase may be present) may each consist of one or more liquid crystal polymers, at least one matrix phase polymer and at least one reinforcing phase polymer being different polymers. Preferably and typically, the reinforcing phase in the final product is in the form of long fibers, not over about 10 microns in diameter and typically having a high aspect ratio, (i.e. length to diameter ratio) of at least 10, and typically these fibers are essentially unidirectionally oriented.

The mixing apparatus may be, for example, a single screw extruder in series with a suitable static mixer and extrusion die, or a twin screw extruder having an extrusion die. Other high shear (or high strain) mixing apparatus may also be used. Good results have been obtained by using a Werner and Pfleiderer ZSK 30 twin screw extruder. The blend is extruded in the form a strand, which upon solidification may be chopped into pellets if desired.

The blend may be melt processed at a temperature within the range of about 280° C. to about 350° C. The processing temperature is the temperature at which both polymers are melt processable. The ingredients are brought up to processing temperature at the beginning of the mixing operation and are thereafter maintained in the desired temperature range. In the case of the preferred apparatus, the ingredients are brought up to temperature near the feed end of the single screw extruder and are thereafter maintained at appropriate processing temperature by appropriate controls of the various independently adjustable heating sections.

The preferred product polymer composition or blend is a self-reinforced polymer composite in which one LCP is the matrix and the other LCP is in the form of predominantly unidirectionally oriented long continuous fibers or strands, oriented in the direction of extrusion. Fiber diameters are predominantly less than 10 microns, primarily in the range of about 1 micron to about 10 microns, although fibers of other diameters can be obtained. The polymer composite is characterized as self-reinforced because the wholly aromatic fibers are formed in situ during the mixing process rather than being fed to the mixing apparatus as solid fibers. The proportions of ingredients in the polymer composite are essentially the same as in the feed.

The product polymer composite may be further processed as desired. For example, the polymer composite may be pelletized and then formed into shaped articles, tapes, films or fibers. This shaping may be accomplished by conventional means such as extrusion, injection molding, etc. Molded composite articles may be formed by injection molding. Films may be formed by conventional means such as melt extrusion or casting. Fibers may be formed by conventional melt spinning techniques. Polymer composites of this invention are especially suitable for injection molding.

Products of the present invention exhibit exceptional mechanical properties, including tensile modulus, tensile strength and notched Izod impact strength. Mechanical properties, especially tensile modulus and tensile strength, are significantly higher than those of any unreinforced plastic hitherto known or of the self-reinforced composites of a flexible chain polymer and a liquid crystal polymer as described in U.S. Pat. Nos. 4,728,698 or 4,835,047 cited above. In fact, composites of this invention appear to have tensile strength comparable to those of steel on a volume basis, and to have strengths exceeding those of aluminum on a volume basis. On a weight basis, the composite materials of this invention are much stronger than either steel or aluminum, since the density of the new materials is about 1.4 versus about 2.7–2.8 for aluminum and approximately 7.5 for steel. This means that the novel polymer composites or blends give light weight strong materials.

The tensile modulus of the new materials of this invention exceed those of any known unreinforced plastic material. Tensile moduli of products of this invention are comparable to those of short glass fiber reinforced thermoplastics, and are about one third that of aluminum and about one tenth that of stainless steel.

Impact properties of composites of this invention are either similar or superior to those of composites based on a thermoplastic flexible chain polymer. Mechanical properties of the present polymer composites, for the most part, are well above the values which would be predicted from the Rule of Mixtures. The discussion of the Rule of Mixtures can be found in Lawrence E. Nielsen, "Mechanical Properties of Polymers and Composites," vol. 2, Marcel Dekker, Inc., New York 1974; pages 455 and 465 are of particular interest. Also surprising and unexpected is the fact that blends of this invention are in the form of composites in which one LCP is in the form of long, continuous, predominantly unidirectionally oriented fibers in a matrix of the other LCP.

Composites of the present invention are anisotropic. That is, they exhibit better tensile properties, e.g., higher secant modulus, higher tensile strength and greater elongation in the fiber or flow direction than they do in the transverse or cross direction. Tensile properties of composites of this invention are much improved over those of the unreinforced base polymer in the flow direction.

Polymer composites of this invention are also characterized by high heat resistance and good electrical properties which remain stable over a wide range of temperatures and frequencies. Polymer composites of this invention also have good flame resistance.

Polymer composites of this invention are especially useful in high performance applications where high tensile strength, high modulus and good impact resistance are required or at least highly desirable. These products are particularly useful in various electrical, electronics, aerospace and automotive applications. In particular, polymer composites of this invention are useful in automotive and aerospace applications as replacements for present composite components which are produced by sheet molding compound technology. Products of this invention can be produced at faster rates and with less power consumption, resulting in lower product costs, compared to conventional composites in which fibers are prepared in advance. The additional step involving fiber preparation, the cost of machinery and the time required to prepare fibers are avoided.

Self-reinforced polymer compositions having a high degree of toughness (which is measurable by the Izod impact test) can be obtained by appropriate control of crystallization conditions. Such control affects the toughness of the base polymer, which in turn affects the toughness of the polymer composite. Polymer composites of this invention are appreciably tougher than the corresponding base polymers.

Polymer composites of this invention are suitable for making shaped articles such as films, sheets, laminates, filaments, rods or any other shaped article, including three-dimensional shapes. These polymer composites can be shaped into desired objects by conventional processing techniques such as extrusion, molding (e.g., injection molding), thermoforming and pultrusion.

This invention will now be further described in detail with reference to the specific example that follows. It will be understood that this example is by way of illustration of the invention and not by way of limitation of the scope thereof.

The first melt processable wholly aromatic polyester used in the examples was a thermotropic liquid crystal polymer supplied by the Celanese Research Company, Summit, N.J. under the designation "Vectra" A950. This material is designated as LCP-1 in the example. This polymer has a melting point of 275° C. and is believed to consist essentially of about 25–30 mole percent of 6-oxy-2-naphthoyl moieties and 70–75 mole percent of p-oxybenzoyl moieties.

The other thermotropic liquid crystal polymer used in the examples (LCP-2) was "Ultrax" KR-4002, supplied by Badische Anilin und Sodafabrik (BASF) of Ludwigshafen, Germany. This polymer has a melting point of 292° C. and is believed to consist of p-oxybenzoyl, terephthaloyl and hydroquinone moieties.

EXAMPLE 1

Test samples of wholly aromatic polyester ("Vectra" A 950) (LCP-1) and "Ultrax" KR-4002 (LCP-2) and blends thereof were prepared by dry mixing pellets of the two polymers at ambient temperature to form a physical mixture, and drying this mixture at 110° C. for 24 hours in a vacuum oven. Compositions ranged from 100 percent LCP-1 to 100 percent LCP-2. Blends contained either 25 percent, 50 percent or 75 percent by weight of LCP-1, balance LCP-2, and are denoted herein as Blend 1, Blend 2 and Blend 3, respectively. The dried and blended pellets were fed to a ZSK 30 twin screw extruder, sold by Werner and Pfleiderer Corp., of Ramsey, N.J. This extruder had two co-rotating screws, both rotated at 200 rpm, and five heating zones. The first zone (at the inlet end) was maintained at 250° C., the other zones at 300° C. The polymer blend was extruded as thin rods, which were quenched with water at ambient temperature. The quenched rods were pelletized.

These pellets were then fed to a BOY 15S reciprocating screw injection molding machine with a maximum shot size of 36 cm$^3$. The following process conditions were used for molding of pure LCP-1, pure LCP-2 and all blends:

| | |
|---|---|
| Barrel temperature | |
| inlet zone | 250° C. |
| other zones | 300° C. |
| Nozzle temperature setting | 100% |
| Mold temperature | 150° C. |
| Injection speed | Maximum |
| Clamping force | 24 tons |
| Injection pressure | 2000 psi |
| Back pressure | 0 psi |
| Cycle time | 1 min. |
| Screw speed | 260 rpm |

Samples of the injection molded blends described herein were broken and the exposed cross-sectional surface was observed in a Scanning Electron Microscope (SEM) model ISI-SX-40 (International Scientific Instruments) and were found to be in the form of fibers of predominantly 1 to 5 microns in diameter. These fibers were oriented essentially in the direction of molding and were well distributed across the surface of the material.

Viscosities of LCP-1, LCP-2 and blends thereof as a function of shear rate were measured at 280° C. and at various shear rates ranging from about 100 to about 1000 sec$^{-1}$. Results are shown in Table I and FIG. 1. As shown in FIG. 1, pure "Vectra" A950 (LCP-1) had a melt viscosity at least 5 times as great as that of pure "Ultrax" KR-4002 (LCP-2) at the same temperature and shear rate, and blends tended to have lower viscosities than the values which would be predicted from the Rule of Mixtures.

TABLE I

VISCOSITY VERSUS SHEAR RATE

| SHEAR RATE (Sec$^{-1}$) | VISCOSITY (Pa-Sec) LCP-1 | Blend #3 | Blend #2 | Blend #1 | LCP-2 |
|---|---|---|---|---|---|
| 118.0 | 267.1 | 69.0 | 34.5 | 13.8 | 11.5 |
| 236.0 | 175.0 | 41.0 | 21.6 | 18.4 | 13.8 |
| 393.4 | 138.1 | 47.3 | 34.5 | 22.8 | 16.2 |
| 786.7 | 103.6 | 33.8 | 31.1 | 20.7 | 16.5 |

In Table I above and throughout the Examples, Blends 1, 2 and 3 contained 25%, 50% and 75% by weight respectively of LCP-1, the balance being LCP-2.

Injection molded samples of pure LCP-1, pure LCP-2 and each polymer blend was subjected to impact and stress-strain tensile tests.

Figure 2:
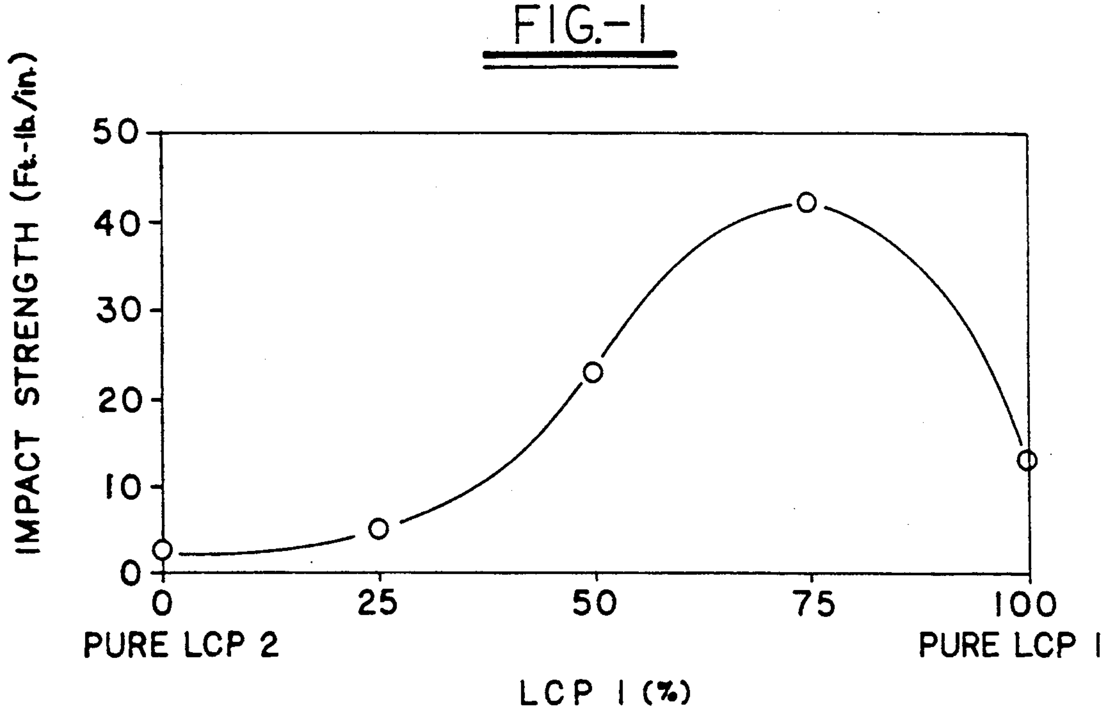
FIG. 2 is a graph showing impact strength of the first liquid crystal polymer (LCP-1), the second liquid crystal polymer (LCP-2) and blends thereof.

Impact tests were carried out according to ASTM method D 235 C, using dumbbell shaped samples (standard tensile bars) 6.3 cm in length and having notches 0.125 inch (about 0.32 cm) in width, and using 5.0 lb. and 10.0 lb. pendulums. Impact strengths, in foot-pounds of force per inch (ft-lb/in) of notch, were found to be as shown in FIG. 2.

Figure 3:
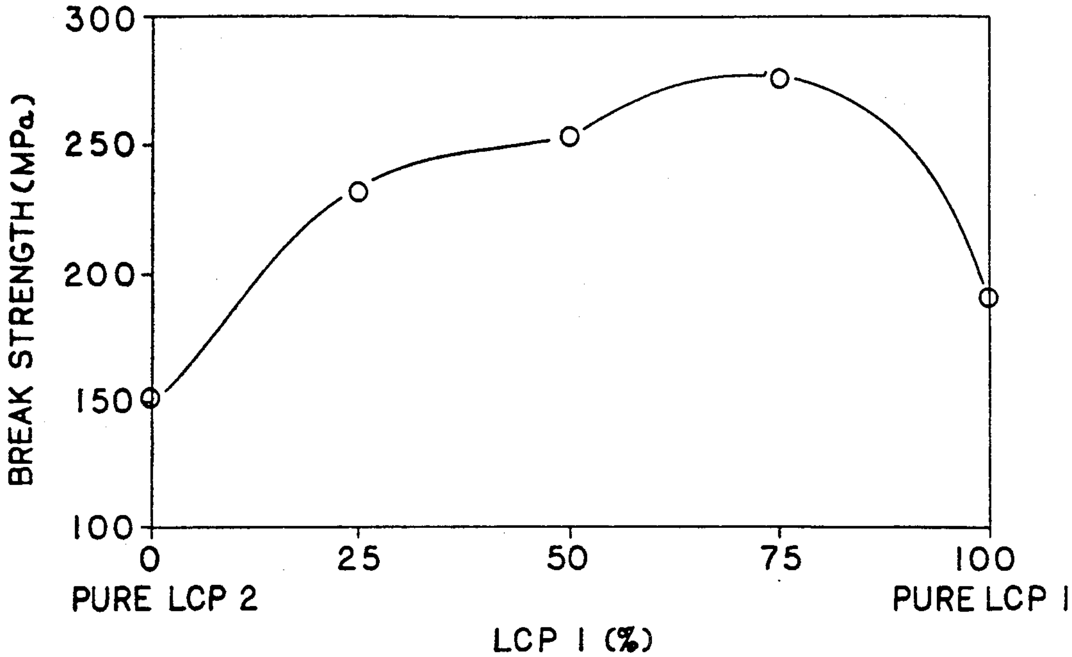
FIG. 3 is a graph showing the break strength of LCP-1, LCP-2 and blends thereof.
Figure 4:
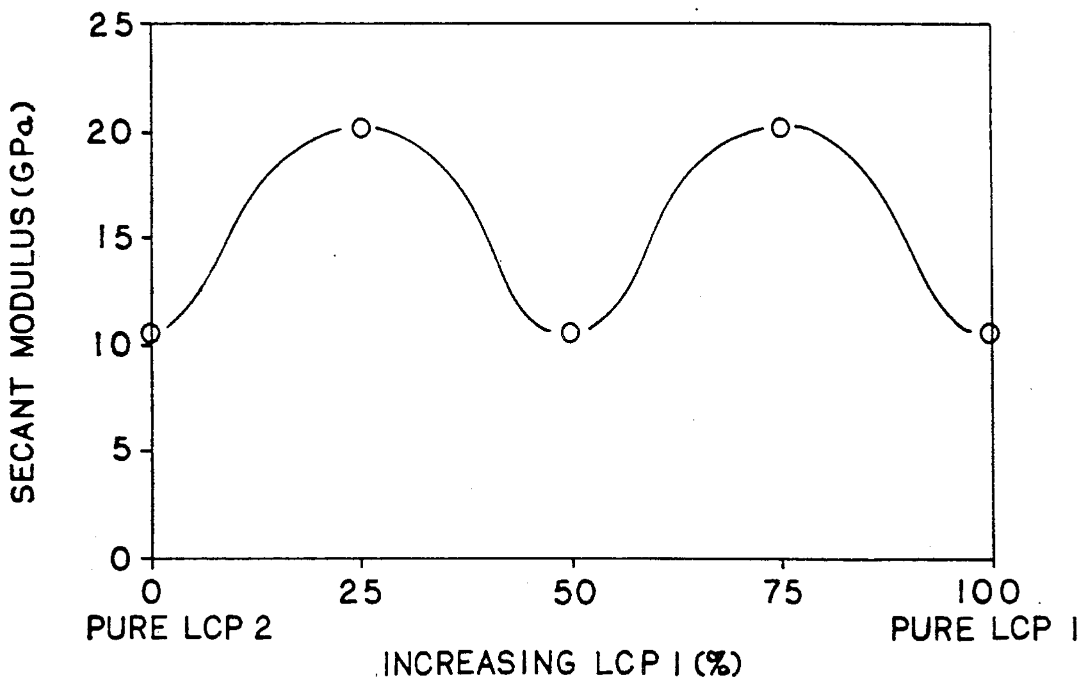
FIG. 4 is a graph showing secant modulus of pure LCP-1, pure LCP-2 and blends thereof.

Tensile properties, i.e. break strength (in megapascals, or MPa) and secant modulus at 1% strain (in gigapascals, or GPa) were measured on a Monsanto tensile tester (Model T-500) with a crosshead speed of 0.18 inch/min. The test specimens were mini-tensile bars. Break strength test results are shown in FIG. 3. Secant modulus test results are shown in FIG. 4. Results are also shown in TABLE II below.

TABLE II

Mechanical Properties of Blends

| Blend | Impact Strength (Ft-lb/inch) | Break Strength MPa | Modulus @ 1% strain GPa |
|---|---|---|---|
| LCP-2 | 4.8 | 152.2 | 10.8 |
| Blend 1 | 7.0 | 237.1** | 19.9 |
| Blend 2 | 24.3 | 253.7** | 12.2 |
| Blend 3 | 44.6* | 273.6** | 20.1 |
| LCP-1 | 12.1 | 192.8 | 12.7 |

*Actually higher than stated value. Sample did not fail. It was thrown off of the sample holder after strike of the hammer.
**Higher than stated value. Monsanto tensile tester automatically shut off at this stress value without sample failure.

The blends of the present invention are in the form of self-reinforced polymer composites consisting of a matrix phase and a reinforcing phase, the latter consisting essentially of fibers about 1 to 5 microns in diameter and being predominantly unidirectionally oriented in the direction of flow. These polymer blends exhibit outstanding mechanical properties which generally are better than those of either (or any) constituent liquid crystal polymer in pure form.

By way of illustration, FIG. 3 shows the three polymer blends tested had break strengths ranging from about 235 MPa to about 275 MPa compared to 150 MPa in pure LCP-2 ("Ultrax" KR-4002) and about 200 MPa in pure LCP-1 ("Vectra" A950). Break strength is the same as ultimate strength, measured on the original cross-section of the test specimen. The secant moduli of 25/75 and 75/25 blends of LCP-1 and LCP-2 were also significantly higher than the secant moduli of pure LCP-2 or pure LCP-1. The secant modulus of 50/50 of LCP-1/LCP-2 was about the same as that of either pure liquid crystal polymer and the reasons for this are not understood.

The impact strengths of polymer blends containing either 50 percent or 75 percent of LCP-1 (balance LCP-2) (about 24 ft-lb/inch and about 45 ft-lb/inch, respectively) were vastly greater than the respective impact strength of pure LCP-2 (about 5 ft-lb/inch) or LCP-1 (about 12 ft-lb/inch). A blend containing 25 percent LCP-1 and 75 percent LCP-2 exhibited an impact strength only slightly higher than that of pure LCP-2; this blend is suitable for use where high break strength and high secant modulus are desirable and high impact strength is not required.

The blends of this invention also have mechanical properties, notably break strength and (in the case of 50/50 and 75/25 LCP-1/LCP-2 blends) impact strength which are greater than those of any hitherto known unreinforced plastic material. All tensile and impact test data herein represent the average of 5 samples.

While in accordance with the patent statutes, a preferred embodiment and best mode has been presented, the scope of the invention is not limited thereto, but rather is measured by the scope of the attached claims.

What is claimed is:

1. A blend of thermotropic liquid crystal polymers,
said liquid crystal polymers having overlapping melt processing temperature ranges;
each of said liquid crystal polymers being a wholly aromatic polyester, at least two of said liquid crystal polymers being phase separated in the solid state;
said blend having a matrix phase and a fiber reinforcing phase which is formed in situ under high strain melt processing conditions;
said blend containing a maximum of 98 percent by weight of any one liquid crystal polymer and conversely at least 2 percent combined weight of all other liquid crystal polymers present, based on total weight of liquid crystal polymers in said blend;
said blend having greater tensile strength at break and higher impact strength than those of any constituent liquid crystal polymer in pure form.

2. A blend as claimed in claim 1 wherein a major portion of said reinforcing phase is in the form of elongated fibers having diameters not greater than about 10 microns.

3. A blend according to claim 2 wherein the preponderance of said elongated fibers have aspect ratios greater than about 10.

4. A blend according to claim 2 wherein a preponderance of said elongated fibers are essentially unidirectionally oriented.

5. A blend according to claim 1 said blend consisting essentially of said liquid crystal polymers.

6. A blend according to claim 5 in which each liquid crystal polymer is a wholly aromatic co-polyester.

7. A blend according to claim 1, said blend also containing solid reinforcing agents which are not liquid crystal polymers, each such reinforcing agent being solid at all temperatures at which said blend is melt processable.

8. A blend according to claim 1, said blend being a binary blend of two thermotropic liquid crystal polymers.

9. A blend as claimed in claim 1, said blend also having a higher tensile modulus than that of any constituent liquid crystal polymer in pure form.

10. A blend of thermotropic liquid crystal polymers as claimed in claim 1, said blend being anisotropic.

11. A process for preparing a polymer blend of two or more thermotropic liquid crystal polymers having overlapping melt processing temperature ranges, and wherein each of said liquid crystal polymers is a wholly aromatic polyester and wherein at least two liquid crystal polymers in said blend are processable in the melt phase and phase separated in the solid state,
said process comprising:
mixing said thermotropic liquid crystal polymers in amounts so that no one of said liquid crystal polymers constitutes more than 98 percent of the total polymer blend weight, at a temperature at which all of said polymers are melt processable,
subjecting the melt of said liquid crystal polymers to high strain conditions effective to give, on cooling, a polymer blend comprising a matrix phase and a fiber reinforcing phase,
extruding the resulting blend in the melt phase,
cooling the blend and recovering a solid blend of said thermotropic liquid crystal polymers, said blend in the solid state being a self-reinforced polymer composite comprising a matrix phase and a fiber reinforcing phase, said fiber reinforcing phase being formed in situ under said high strain melt processing conditions.

12. A process according to claim 11 in which said reinforcing phase is predominantly in the form of fibers having a diameter not greater than about 10 microns and an aspect ratio not less than about 10 and in which said fibers are essentially unidirectionally oriented.

13. A process according to claim 11 in which said blend is a binary blend containing two of said liquid crystal polymers.

14. A process according to claim 11 wherein said blend contains one or more solid reinforcing agents, each such reinforcing agent being solid at temperatures at which the blend is melt processable.

15. A process according to claim 11 in which each of said liquid crystal polymers is a wholly aromatic copolyester.

16. A shaped article prepared from a blend according to claim 1.

* * * * *